United States Patent
Nakase et al.

(10) Patent No.: US 8,747,131 B2
(45) Date of Patent: Jun. 10, 2014

(54) CARD CONNECTOR WITH IMPROVED EJECTOR CAM PORTION

(75) Inventors: Yusho Nakase, Yokohama (JP); Xiao-Dong Hu, Shenzhen (CN); Shi-Jie Tan, Shenzhen (CN); Zhen-Ye Lin, Shenzhen (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 50 days.

(21) Appl. No.: 13/459,090

(22) Filed: Apr. 28, 2012

(65) Prior Publication Data

US 2012/0276764 A1    Nov. 1, 2012

(30) Foreign Application Priority Data

Apr. 29, 2011 (CN) .......................... 2011 1 0110921

(51) Int. Cl.
*H01R 13/62* (2006.01)
(52) U.S. Cl.
USPC .......................................................... 439/159
(58) Field of Classification Search
USPC .......................................... 439/159, 160, 372
See application file for complete search history.

(56) References Cited

U.S. PATENT DOCUMENTS

| | | | |
|---|---|---|---|
| 5,315,478 A | 5/1994 | Cadwell et al. | |
| 5,655,918 A * | 8/1997 | Soh | 439/159 |
| 6,027,350 A | 2/2000 | Chen | |
| 6,120,309 A * | 9/2000 | Hara | 439/159 |
| 6,609,918 B2 * | 8/2003 | Uchikawa | 439/159 |
| 7,766,678 B1 * | 8/2010 | Abe | 439/159 |
| 7,865,210 B2 | 1/2011 | Wang et al. | |
| 8,145,261 B2 | 3/2012 | Wang et al. | |
| 8,393,908 B2 * | 3/2013 | Li | 439/159 |
| 2002/0058434 A1 * | 5/2002 | Nishio et al. | 439/159 |
| 2004/0018761 A1 * | 1/2004 | Akasaka et al. | 439/159 |
| 2004/0235325 A1 * | 11/2004 | Iijima | 439/159 |
| 2007/0141878 A1 * | 6/2007 | Van der Steen et al. | 439/159 |
| 2009/0267677 A1 | 10/2009 | Myers et al. | |
| 2011/0070760 A1 | 3/2011 | Zhang | |

FOREIGN PATENT DOCUMENTS

TW    M378535    4/2010

* cited by examiner

*Primary Examiner* — Gary Paumen
(74) *Attorney, Agent, or Firm* — Wei Te Chung; Ming Chieh Chang

(57) ABSTRACT

A card connector (100) includes an insulative housing (10), a number of contacts (30) retained in the insulative housing, a metal shell (20) covering the insulative housing for defining a receiving space (60), and an ejector (50) assembled on the insulative housing. The ejector includes a cam portion (51) and a shaft (52) actuating the cam portion. The cam portion includes a pivoting portion (510), a first arm portion (511) and a second arm portion (512) respectively and angularly extending from the pivoting portion, and at least one positioning portion (513) extending from the pivoting portion along a vertical direction. At least one of the metal shell and the insulative housing defines a hole (19, 25) receiving the at least one positioning portion.

20 Claims, 8 Drawing Sheets

CARD CONNECTOR WITH IMPROVED EJECTOR CAM PORTION

CROSS-REFERENCE TO RELATED APPLICATIONS

This patent application relates to a U.S. patent application Ser. No. 13/459,091, filed on Apr. 28, 2012, entitled ""(US39519) and another U.S. patent application Ser. No. 13/459,089, filed on Apr. 28, 2012 entitled ""(US39639), both of which are assigned to the same assignee as this application.

BACKGROUND OF THE INVENTION

1. Field of the Invention

The present invention relates generally to a card connector, and more particularly to a card connector preventing an ejector thereof from being damaged.

2. Description of Related Arts

U.S. Application Pub. No. 2011/0070760 discloses an electrical card connector comprising an insulative housing, a plurality of contacts retained in the insulative housing, a metal shell covering the insulative housing, and an ejector assembled at a side of the insulative housing. The ejector comprises a cam portion and a shaft actuating the cam portion. The cam portion defines an aperture and the insulative housing forms a pivoting portion protruding in the aperture. Therefore, the cam portion rotates around the pivoting portion. In accordance with minimization of electronic device, a micro SIM (Subscriber Identity Module) card connector receiving a micro SIM card has been used. The cam portion of the ejector in such micro SIM card connector has a small size for defining the aperture. Therefore, the pivoting portion with small diameter is permitted to extend through the aperture. However, the pivoting portion with small diameter may not be strong enough in structure, inducing that the ejector can't be use for ever.

Hence, a card connector has a long lifecycle ejector is desired.

SUMMARY OF THE INVENTION

Accordingly, an object of the present invention is to provide has a long lifecycle ejector.

To achieve the above object, a card connector includes an insulative housing, a number of contacts retained in the insulative housing, a metal shell covering the insulative housing for defining a receiving space, and an ejector assembled on the insulative housing. The ejector includes a cam portion and a shaft actuating the cam portion. The cam portion includes a pivoting portion, a first arm portion and a second arm portion respectively and angularly extending from the pivoting portion, and at least one positioning portion extending from the pivoting portion along a vertical direction. At least one of the metal shell and the insulative housing defines a hole receiving the at least one positioning portion.

Other objects, advantages and novel features of the invention will become more apparent from the following detailed description when taken in conjunction with the accompanying drawings.

DETAILED DESCRIPTION OF THE PREFERRED EMBODIMENT

Figure 1:
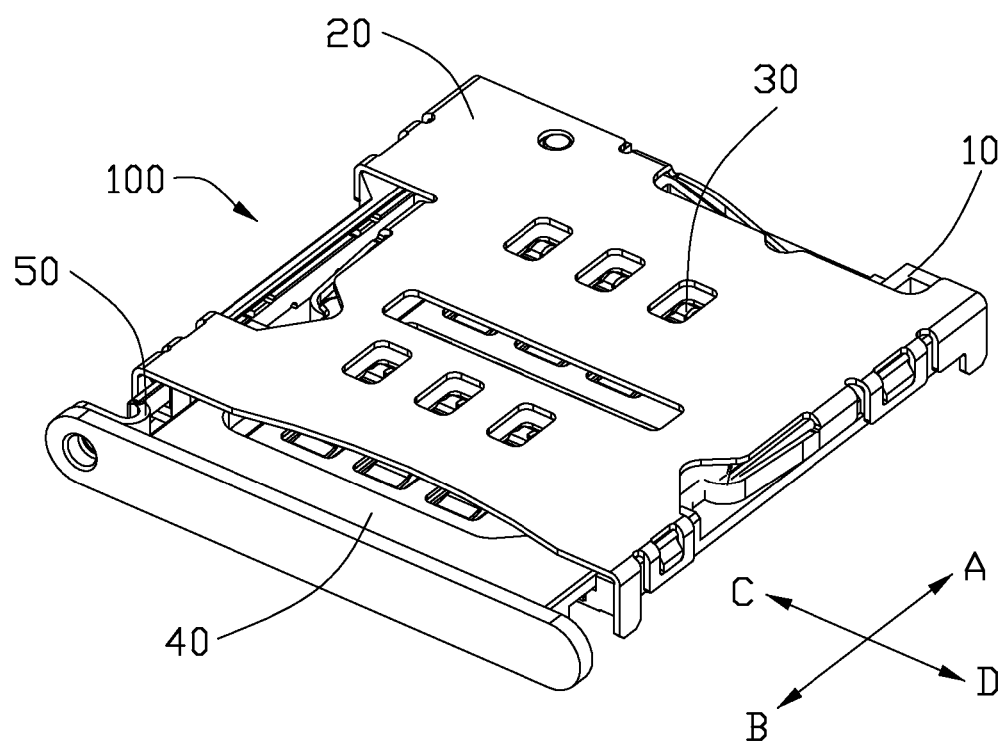
FIG. 1 is a perspective, assembled view of a card connector constructed in accordance with the present invention.

Reference will now be made in detail to the preferred embodiment of the present invention.

Referring to FIGS. 1-8, a tray-type card connector 100 is accordance with the present invention used for receiving and electrical card, includes an insulative housing 10, a metal shell 20 attached to the inculative housing 10 for cooperatively defining a receiving space 60, a plurality of contracts 30 fixed in the insulative housing 10, a tray 40 slidably received in the receiving space 60 along an insertion direction A, and an ejector 50 ejecting the tray 40 from the receiving space 60 along an enection direction B which is opposite to the insertion direction A. Furthermore, a left direction C and a right direction D are defined when taken a view along the insertion direction A. In accordance with the embodiments of the present disclosure, the card connector 100 is a micro SIM card connector and the electrical card in a micro SIM card, accordingly.

Figure 2:
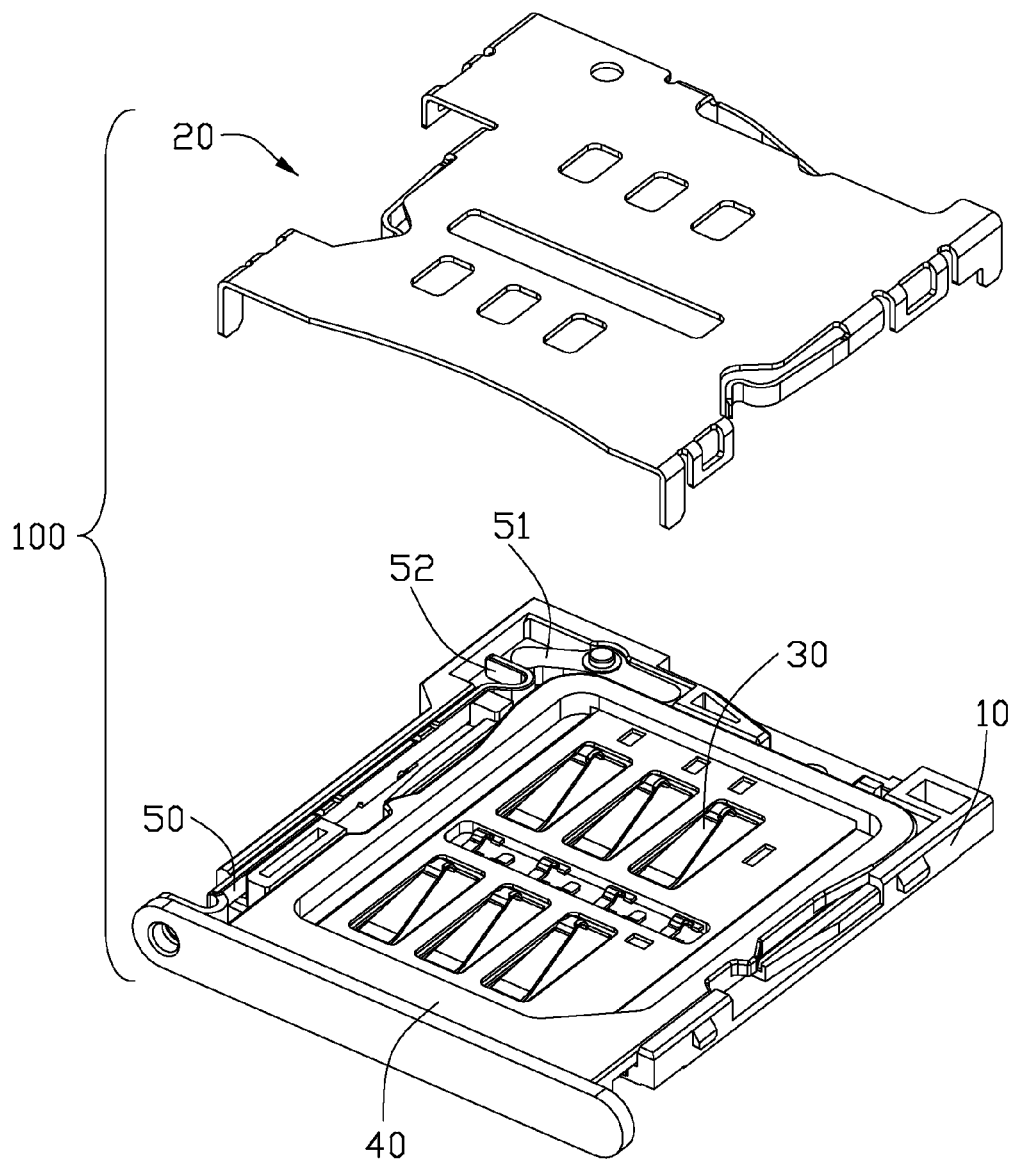
FIG. 2 is a perspective, partly exploded view of the card connector when a metal shell is separated from other parts thereof.

Referring to FIG. 2, the insulative housing 10 comprises a base portion 11, a pair of vertical walls 12, and a rear wall 17 extending upwardly from the base portion 11. The contacts 30 are retained on the base portion 11 with contacting portions (not labeled) thereof extending into the receiving space 60. The right vertical wall 12 forms two protrusions 13 projecting outwardly. Each vertical wall 12 defines an interspace 14 and forms a block portion 15 extending towards the interspace 14. A guiding surface 151 is defined adjacent to the interspace 14. The insulative housing 10 defines a channel 16 for assembling the ejector 50. The channel 16 is positioned beside the left vertical wall 12. The rear wall 17 defines an arc recess 18 facing towards the receiving space 60 and the base portion 11 defines a first hole 19 at frontal of the arc recess 18.

Figure 3:
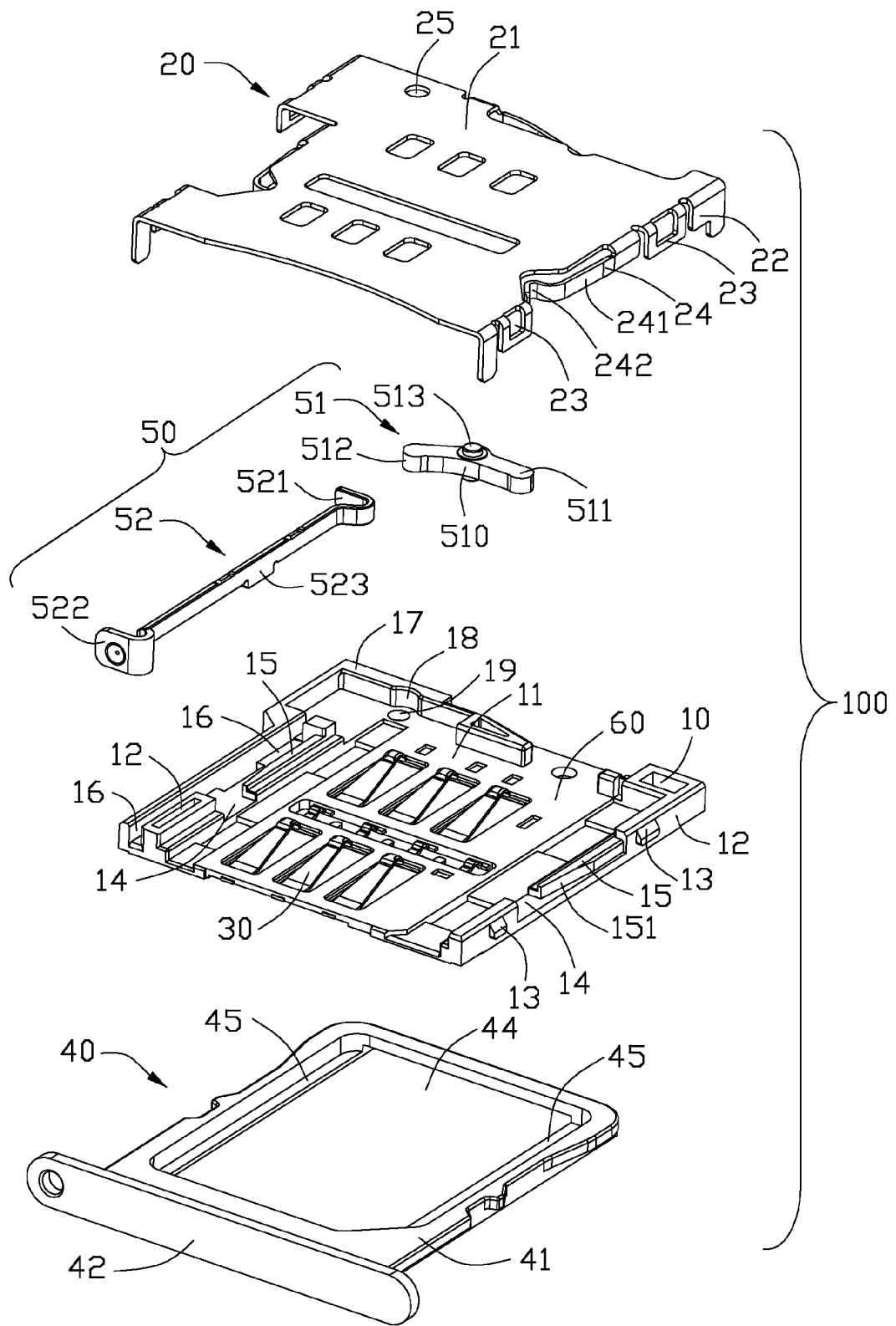
FIG. 3 is a perspective, exploded view of the card connector.

Referring to FIGS. 1-3, the metal shell 20 comprises a main portion 21 and a pair of lateral walls 22 extending downwardly from the main portion 21. The lateral walls 22 define a plurality of apertures 23 receiving the protrusions 13 for securing the metal shell 20 with the insulative housing 10. The metal shell 20 comprises an elastic portion (spring tang) 24 extending forwardly and inwardly into the receiving space 60 through the cutout 14. The elastic portion (spring tang) 24 has a flexible arm 241 extending along the ejection direction B and a securing portion 242 curvedly formed at the end of the flexible arm 241. The main portion 21 defines a second hole 25 corresponding to the first hole 19 along a vertical direction perpendicular to both the opposing insertion/ejection directions A and B and the opposing left/right directions C and D.

Figure 4:
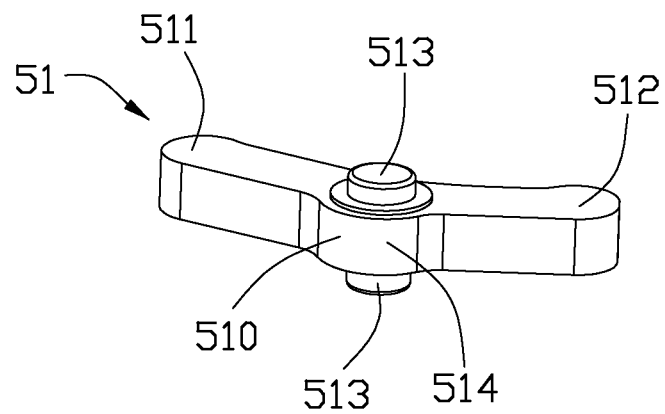
FIG. 4 is a perspective view of a cam of an ejector assembled in the card connector.

Referring to FIGS. 3 and 4, the ejector 50 comprises a cam portion 51 and a shaft 52 actuating the cam portion 51. The cam portion 51 comprises a pivoting portion 510, a first arm portion 511 and a second arm portion 512 respectively and angularly extending from the pivoting portion 510 in a horizontal plane in which the opposing insertion/ejection directions A and B and the opposing left/right directions C and D extend, and a pair of positioning portions 513 extending from the pivoting portion 510 in the vertical direction. The positioning portions 513 are respectively received in the first hole 19 of the insulative housing 10 and the second hole 25 of the metal shell 20 such that the cam portion 51 rotates in the horizontal plane around the pivoting portion 510. A connection between the first arm portion 511 and the second arm portion 512 is functioned as the pivoting portion 510. Therefore, rigid of the pivoting portion 510 is guaranteed and the pivoting portion 510 is not easily broken. Furthermore, the pivoting portion 510 has a smooth rear surface 514 scrubbing the rear wall 17 in the arc recess 18 such that the rear wall 17 sustains main pressure from the cam portion 51. The first hole 19 of the insulative housing 10 and the second hole 25 of the metal shell 20 are just for positioning the cam portion 51 because the insulative housing 10 and the metal shell 20 sustain small pressure from the cam portion 51 for protection to the insulative housing 10 and the metal shell 20. The shaft 52 comprises an actuating portion 521, an operating portion 522, and a connecting portion 523 connecting between the actuating portion 521 and the operating portion 522. The connecting portion 523 is moveable in the channel 16. The operating portion 523 extends out of the receiving space 60. The actuating portion 521 confronts the second arm portion 512 and is capable of driving the cam portion 51 to move around the pivoting portion 510.

Figure 5:
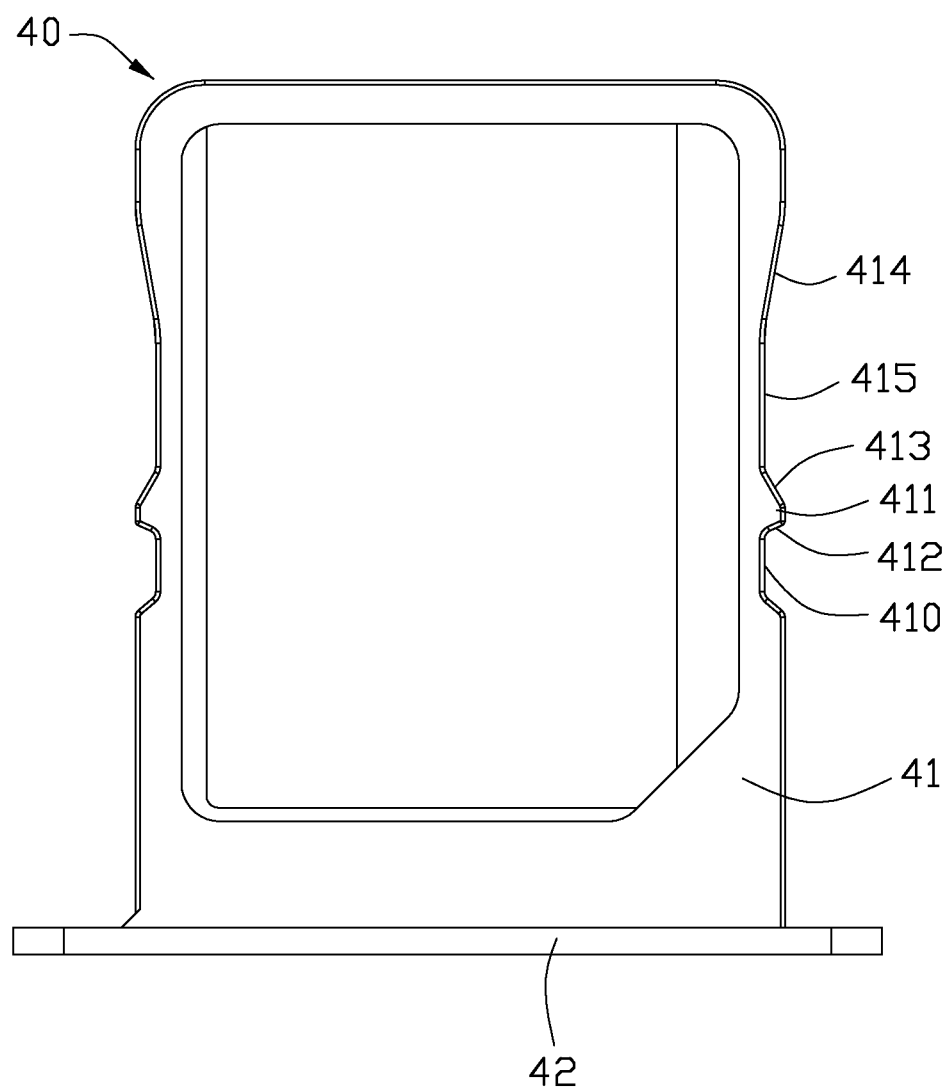
FIG. 5 is a top plan view of a tray of the card connector.
Figure 6:
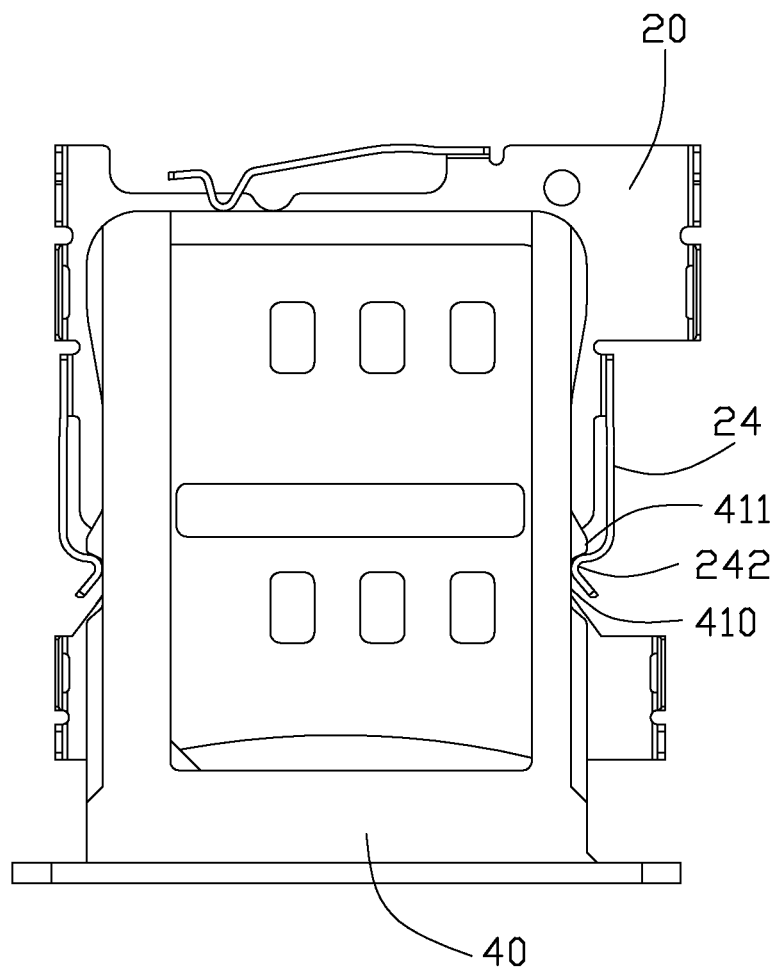
FIG. 6 is a top plan view of the card connector when the tray is fully inserted in the card connector.
Figure 7:
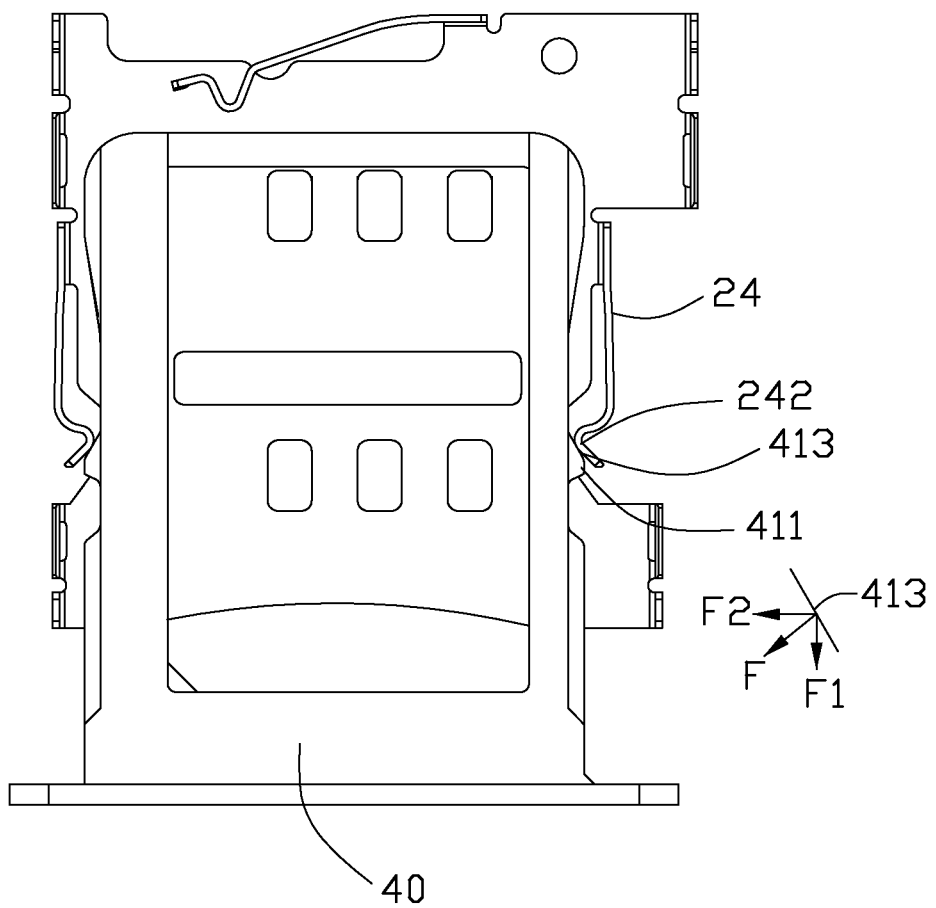
FIG. 7 is a top plan view of the card connector when the tray is initially ejected from the card connector.
Figure 8:
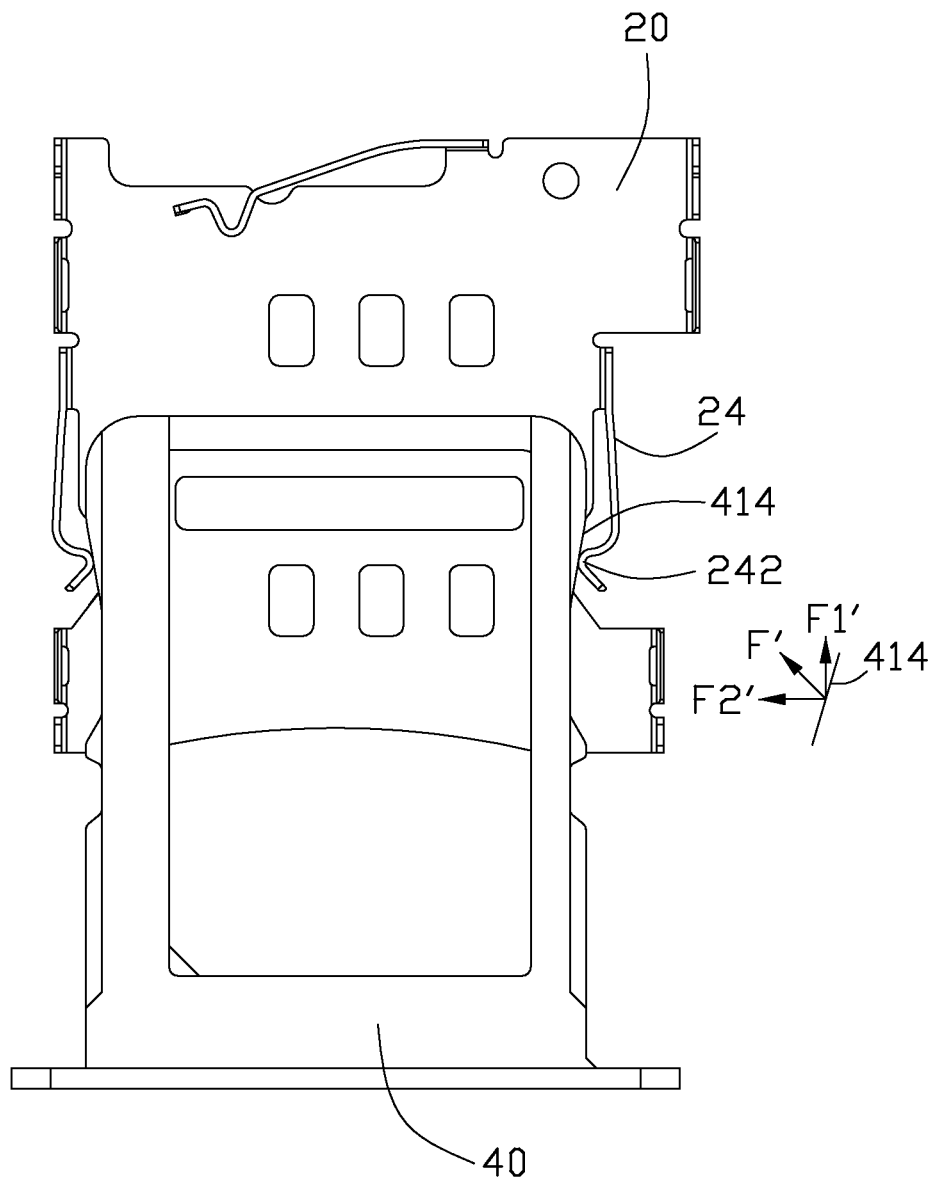
FIG. 8 is a top plan view of the card connector when the tray is about to be fully ejected from the card connector.

Referring to FIGS. 3, 5 and 6, the tray 40 comprises a frame portion 41 and a door portion 42 at frontal of the frame portion 41. The door portion 42 is integral with the frame portion 41 for increasing intension purpose in a preferred embodiment. In another embodiment, the door portion 42 is separately formed and then assembled to the frame portion 41. The door portion 43 is pre-located to fill with an insertion opening of an electronic device (not shown) on which the card connector 100 is assembled. The frame portion 41 is recessed in the middle thereof to have a card receiving room 45. The frame portion 41 defines an opening 44 below the card receiving room 45 such that the contacts 30 are capable of connecting with the electrical card through the opening 44. The frame portion 41 has two lateral edges (not labeled) and each lateral edge has a notch 410, a projecting portion 411, and a dent 415 in turn along the insertion direction A. A sharp surface 412 is defined between the notch 410 and the projecting portion 411. In a preferred embodiment, the sharp surface 412 is angled from the insertion/ejection directions A and B at 75°-90°. Therefore, a user gets a first clear feeling when the securing portion 242 of the elastic piece 24 moves from the dent 415, across the projecting portion 411, and into the notch 410. The notch 410 snaps with the securing portion 242 of the metal shell 20 when the tray 40 is fully inserted in the receiving space 60 showing as FIG. 6.

Referring to FIGS. 5-8, the tray 40 defines a slope surface 413 between the dent 415 and the projecting portion 411. In a preferred embodiment, the slope surface 413 is angled from the insertion/ejection directions A and B at 15°-45°. Particularly referring to FIG. 7, the tray 40 endures a pressure force F on each slope surface 413 when the tray 40 is initially ejected from the card connector 100. The pressure force F is split into a first component of force F1 along the card ejection direction B and a second component of force F2 along the left/right direction A/B. The second components of forces F2 are quits along the left/right direction. Therefore, the tray 40 endures two times of the first component of force (2F1) from the elastic portions 24 of the metal shell 20. The tray 40 is additionally pushed by the elastic portions 24 of the metal shell 20 when the elastic portions 242 are moved on the slope surface 413. Therefore, the tray 40 is swimmingly ejected from the receiving space 60. The user gets a second clear feeling when the securing portion 242 of the elastic piece 24 moves from the notch 410, across the projecting portion 411, and into the dent 415. Therefore, the card connector 100 provides dual feelings during both insertion and ejection of the tray 40, reminding the user that the tray 40 is fully inserted in the card connector 100 and the tray 40 begins to be ejected from the card connector 100 as well.

Referring to FIGS. 5-8, the tray 40 defines an inclined surface 414 at the other side of the dent 415 with respect to the slope surface 413. In a preferred embodiment, the inclined surface 414 is angled from the insertion/ejection directions A and B at 15°-30°. Particularly referring to FIG. 8, the tray 40 endures a pressure force F' on each inclined surface 414 when the tray 40 is about to be fully ejected from the card connector 100. The pressure force F' is split into a first component of force F1' along the card ejection direction B and a second component of force F2' along the left/right direction A/B. The second components of forces F2' are quits along the left/right direction A/B. Therefore, the tray 40 endures two times of the first component of force (2F1') from the elastic portions 24 of the metal shell 20. Therefore, the tray 40 is slowed down when the elastic portions 242 bias the inclined surfaces 414 such that the tray 40 is prevented from flying out of the card receiving space 60 showing as FIG. 8.

In the abovementioned embodiment, the cam portion 51 is one unitary piece, and so, two positioning portions 513 extend from the pivoting portion 510 along the vertical direction. The pivot portion is optionally equipped with a torsion spring to urge the cam portion in a steady position and manner. Both the metal shell 20 and the insulative housing 10 define positioning holes 25, 19 receiving the positioning portions 513. Actually, a second embodiment that at least one positioning portion 513 is formed on the cam portion 51 and at least one of the metal shell 20 and the insulative housing 10 defines a hole 25/19 correspondingly receiving the at least one positioning portion 513 is available. Furthermore, a third embodiment that the hole is defined on the cam portion 51 and the at least one positioning portion is formed on one of the metal shell 20 and the insulative housing 10 is available, too. However, the at least one positioning portion and the hole are not simultaneously and correspondingly formed on the metal shell 20 and the insulative housing 10.

While a preferred embodiment in accordance with the present invention has been shown and described, equivalent modifications and changes known to persons skilled in the art according to the spirit of the present invention are considered within the scope of the present invention as described in the appended claims.

What is claimed is:
1. A card connector comprising:
an insulative housing;
a plurality of contacts retained in the insulative housing;
a metal shell covering the insulative housing for defining a receiving space; and
an ejector assembled on the insulative housing, the ejector comprising a cam portion and a shaft actuating the cam portion, the cam portion comprising a pivoting portion, a first arm portion and a second arm portion respectively and angularly extending from the pivoting portion, and at least one positioning portion extending from one of the pivoting portion and the insulative housing along a vertical direction;

wherein at least one of the insulative housing and the pivoting portion defines a hole receiving the at least one positioning portion.

2. The card connector as claimed in claim 1, wherein the insulative housing comprises a rear wall defining an arc recess and the pivoting portion has a smooth rear surface scrubbing the rear wall in the arc recess.

3. The card connector as claimed in claim 1, wherein the shaft comprises an actuating portion confronting the second arm portion and driving the cam portion to move around the pivoting portion.

4. The card connector as claimed in claim 3, wherein the shaft comprises an operating portion extending out of the receiving space.

5. The card connector as claimed in claim 1, wherein the hole is defined on the insulative housing and the at least one positioning portion is formed on the cam portion.

6. The card connector as claimed in claim 1, wherein the hole is defined on the cam portion and the at least one positioning portion is formed on the insulative housing.

7. A card connector comprising:
an insulative housing defining an upward mating face;
a plurality of contacts disposed in the housing with contacting sections upwardly extending above the mating face;
a metallic shell assemble upon the housing and cooperating with the housing to commonly define a tray receiving space therebetween;
a tray, for carrying a card, back and forth moveably received in the tray receiving space in a front-to-back direction; and
an ejector positioned on one side of the housing and including a cam portion around a corner adjacent to a rear end of the housing, and a shaft back and forth moveable along the front-to-back direction with a rear end actuating said cam portion; wherein
said cam portion being of one unitary piece, defines a pivot portion with first and second arm portions extending laterally on two side in an angled manner under condition that the first arm portion confronts a rear end of the tray and the second arm portion confronts the rear end of the shaft; wherein
the pivot portion extends upward and downwardly into the shell and the housing, respectively, to retain the cam portion in position.

8. The card connector as claimed in claim 7, wherein the shell is equipped with a spring tang to urge the tray forward when the tray is located in a rear position.

9. The card connector as claimed in claim 7, wherein each of the shell and the housing defines a circumferential hole surrounding a corresponding protrusion of the pivot portion.

10. The card connector as claimed in claim 7, wherein the rear end of the shaft is not linked to the cam portion.

11. The card connector as claimed in claim 7, wherein the shell includes a spring arm to engage a notch formed in a side edge of the tray.

12. The card connector as claimed in claim 11, wherein the shell defines a main plate to cover said tray receiving space, and said main plate defines a notch corresponding to a hook section of the spring arm.

13. The card connector as claimed in claim 7, wherein the housing defines a rear wall adjacent to the cam portion, and said rear wall defines a recess to accommodate a portion of the pivot portion.

14. A card connector comprising:
an insulative housing defining an upward mating face;
a plurality of contacts disposed in the housing with contacting sections upwardly extending above the mating face;
a metallic shell assemble upon the housing and cooperating with the housing to commonly define a tray receiving space therebetween;
a tray, for carrying a card, back and forth moveably received in the tray receiving space in a front-to-back direction; and
an ejector positioned on one side of the housing and including a cam portion around a corner adjacent to a rear end of the housing, and a shaft back and forth moveable along the front-to-back direction with a rear end actuating said cam portion, said cam portion and said shaft being not linked to each other; wherein
said cam portion defines a pivot portion with first and second arm portions extending laterally on two side in an angled manner under condition that the first arm portion confronts a rear end of the tray and the second arm portion confronts the rear end of the shaft; wherein
the pivot portion is equipped with a torsion spring to urge the cam portion in a steady position and manner.

15. The card connector as claimed in claim 14, wherein said steady position allows the tray in a locked position.

16. The card connector as claimed in claim 14, wherein a distal end of the first arm of said cam portion extends transversely not beyond a center line of said tray.

17. A card connector comprising:
an insulative housing defining an upward mating face;
a plurality of contacts disposed in the housing with contacting sections upwardly extending above the mating face;
a metallic shell assemble upon the housing and cooperating with the housing to commonly define a tray receiving space therebetween;
a tray, for carrying a card, back and forth moveably received in the tray receiving space in a front-to-back direction, said tray defining a door portion with a through hole therein; and
an ejector positioned on one side of the housing and including a cam portion around a corner adjacent to a rear end of the housing, and a shaft back and forth moveable along the front-to-back direction with a rear end actuating said cam portion, a rear end of the shaft being not linked to the cam portion, said shaft essentially aligned with the through hole of the door portion in the front-to-back direction; wherein
said cam portion defines a pivot portion with first and second arm portions extending laterally on two side in an angled manner under condition that the first arm portion confronts a rear end of the tray and the second arm portion confronts the rear end of the shaft.

18. The card connector as claimed in claim 17, wherein a distal end of the first arm of said cam portion extends transversely not beyond a center line of said tray.

19. The card connector as claimed in claim 17, wherein said shaft defines a front operating portion located behind the through hole of the door portion, and said front operating portion defines a recess aligned with the through hole in said front-to-back direction.

20. The card connector as claimed in claim 19, wherein said front operating portion abuts against a back surface of the door portion when said tray is located in a locked position.

* * * * *